July 5, 1932. A. EILERSGAARD 1,866,093
CLUTCH OPERATING MECHANISM
Filed Jan. 11, 1929
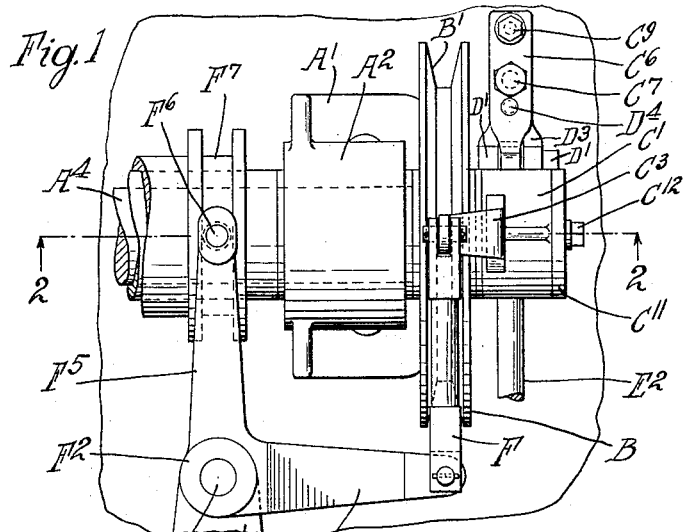
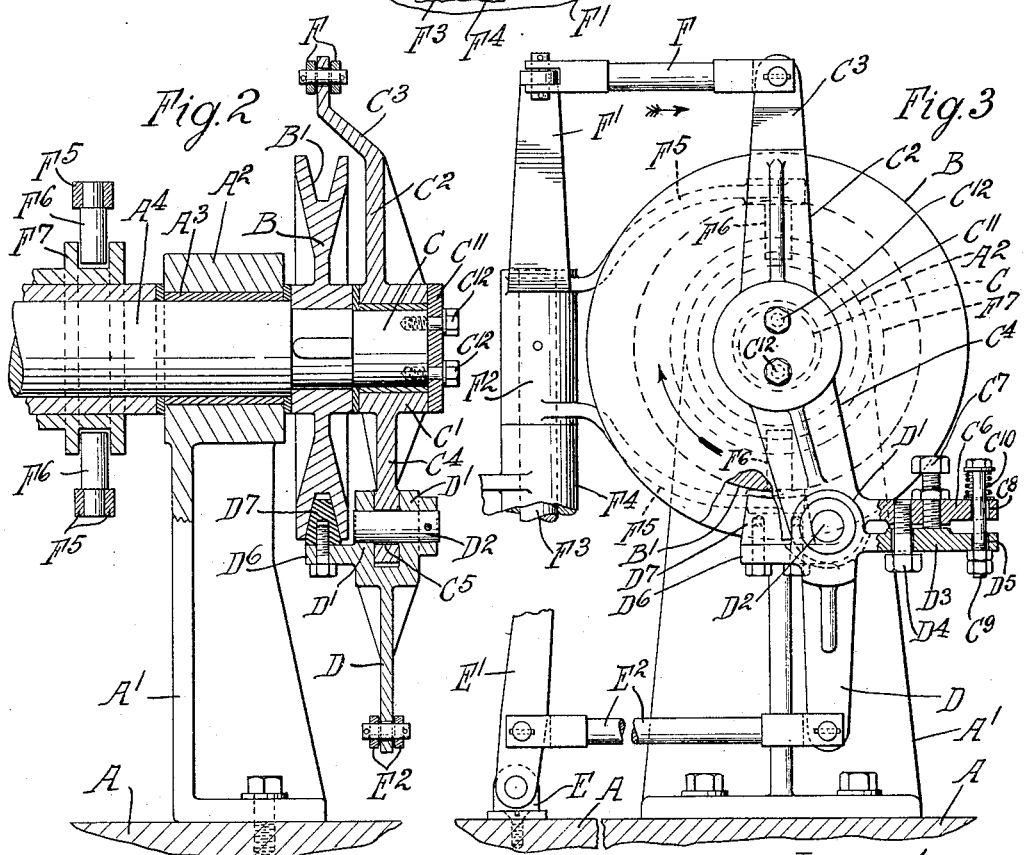
Inventor
Asger Eilersgaard
by Parker + Carter
Attorneys Patented July 5, 1932

1,866,093

UNITED STATES PATENT OFFICE

ASGER EILERSGAARD, OF CHICAGO, ILLINOIS, ASSIGNOR TO LINK-BELT COMPANY, A CORPORATION OF ILLINOIS

CLUTCH OPERATING MECHANISM

Application filed January 11, 1929. Serial No. 331,891.

This application relates to a clutch and particularly to a clutch operating mechanism. It is adapted particularly for use in connection with a booster clutch. In one form this clutch may be used with self-locking toggle clutches. It has for one object to provide a mechanism which will minimize the physical labor required to set the clutch. Another object is to provide such a mechanism which will in addition give the same feel and control of the clutch typical of the ordinary direct connected hand lever. Another object is to provide such a mechanism in which a minimum of working parts is used whereby wear and repair are reduced to a minimum. Other objects will appear from time to time throughout the specification and claims.

The invention is illustrated more or less diagrammatically in the accompanying drawing, wherein—

Figure 1 is a plan view;

Figure 2 is a vertical cross section shown on the line 2—2 of Figure 1;

Figure 3 is an end elevation with parts broken away and parts in section.

Like parts are indicated by like characters throughout.

The clutch and clutch operating mechanism are illustrated as mounted generally on the base A. $A^1$ is a supporting member extending upwardly from the base A carrying at its top a bearing housing $A^2$ within which is positioned a bearing $A^3$ which carries a shaft $A^4$. Keyed adjacent one end of the shaft $A^4$ is a friction wheel B. It is provided in its periphery with a groove $B^1$. The shaft $A^4$ may be provided at its outer end with a reduced end portion C upon which is movably mounted a hub $C^1$.

This hub forms part of a pivot arm assembly. Preferably on its upper side it carries an arm $C^2$ which is provided with a laterally bent portion $C^3$ which overlies the grooved wheel B. On its lower side the hub $C^1$ carries a pivot arm $C^4$ which is perforated at its lower end as at $C^5$ and carries a laterally extending flange $C^6$. $C^7$ is a stop or limit screw threaded in the flange $C^6$. Adjacent its outer end the flange is perforated at $C^8$ and within this perforation there is loosely positioned a bolt $C^9$. About the bolt is a compression spring $C^{10}$ bearing at one end upon the flange $C^6$ and at its other upon the head of the bolt. $C^{11}$ is a holding plate removably held in position on the shaft end portion C by means of screws $C^{12}$ $C^{12}$.

D is a wedge or clutch block carrying lever. Adjacent its upper end it is provided with a pair of eyes $D^1$ $D^1$. Passing through the eyes $D^1$ is a hinge pin $D^2$. This pin also passes through the perforation in the lower end of the lever $C^4$ and thus the lever $C^4$ and the wedge lever D are pivotally joined together. $D^3$ is a flange extending laterally from the member D and being in position in opposition to the flange $C^6$. A cap screw $D^4$ threaded in the flange $C^6$ extends through a perforation in the flange $D^3$ and limits relative movement of the flanges $C^6$ and $D^3$. The bolt $C^9$ extends through a perforation $D^5$ adjacent the outer end of the flange $D^3$. $D^6$ is an additional lateral extension from the wedge lever D. It carries a wedge $D^7$. This wedge is positioned within the groove $B^1$ of the friction wheel B and corresponds in shape to it.

E is a supported member fastened on the base A and pivotally supporting a hand lever $E^1$. A reach rod $E^2$ is pivotally fastened to the hand lever $E^1$ at one end and similarly fastened to the lower end of the wedge lever D at its other end.

F is a reach rod pivotally fastened at one end to the upper end $C^3$ of the lever $C^2$ and at its other end fastened to one arm of a bell crank $F^1$. This bell crank is joined to a cylindrical portion $F^2$ which is supported for movement on a shaft $F^3$. This shaft is carried in a bearing supporting member $F^4$, which is supported from any suitable base. The support is not shown as it forms no principal part of the invention. For the purpose of the invention it is sufficient that the bell crank have a support upon which it is pivotally mounted. Extending from the cylindrical portion $F^2$ is a clutch yoke $F^5$. This yoke comprises the two usual yoke arms as shown. Each carries an engaging pin $F^6$ which normally engage a shift collar $F^7$ by means of which the main clutch is operated.

It will be evident that while I have shown in my drawing an operative device still many changes might be made in size, shape, arrangement and disposition of parts without departing materially from the spirit of my invention and I wish, therefore, that my showing be taken as in a sense diagrammatic.

The use and operation of the invention are as follows:

For the purposes of illustration I have shown the grooved friction wheel as being mounted upon the same shaft which carries the main clutch. The invention is not limited to this arrangement. It is sufficient if the friction wheel be mounted upon a shaft of the general mechanism which revolves at the same time as the clutch shaft.

When the machine is in operation the main shaft and the booster clutch friction wheel revolve clockwise as shown by the arrow in the drawing in Figure 3. In operating the device the operator pulls the hand lever to the left and the motion of this lever through the reach rod $E^2$ actuates the lever D and brings the wedge or clutch block $D^7$ in contact with the friction wheel. This motion then acting through the lever $C^4$ and the lever $C^2$ $C^3$ pulls the reach rod F to the right under the influence of the motion of the wedge or clutch block wheel which now for the moment engages the wedge $D^7$. This movement of the reach rod F moves the bell crank $F^1$ in the same direction and correspondingly shifts the clutch yoke $F^5$ which by reason of its engagement with the shift collar $F^7$ operates the clutch.

The flange elements $C^6$ and $D^3$ cooperate to limit the engagement of the wedge or clutch block because when the operator rotates the lever $E^1$ in a counter-clockwise direction with the lever $C^2$ at rest, this rotates the clutch block lever thereon to cause engagement of the clutch but this rotation is limited by the cooperation of the screw $D^4$ threaded in the flange $C^6$, its head preventing too wide movement of the flange $D^3$ away from the flange $C^6$. In the opposite direction the stop screw $C^7$ prevents too close engagement of the two flanges and the spring $C^{10}$ with its associated screw and in its relation to the two flanges tends to hold them together and normally keep the clutch block out of engagement with the wheel.

When the operator wishes to release the main clutch, he moves the hand lever in the opposite direction. This, of course, moves the reach rod $E^2$ and the wedge lever D in the reverse direction. During this operation the spring $C^{10}$ tends to hold the flange of the wedge lever D solidly against the cap screw $C^7$ and the flange $C^6$ of the lever $C^4$. Thus the effect of moving the hand lever $E^1$ is transmitted through the lever D and the lever $C^4$ and correspondingly through the lever $C^2$ $C^3$, the reach rod F, the bell crank $F^1$ and the clutch yoke is operated thereby to release the main clutch positively. By means of the mechanism provided herewith the operator through the booster clutch can either engage or release the main clutch to any degree which he wishes and he can keep the main clutch engaged by merely holding the hand lever $E^1$ stationary. This booster clutch arrangement therefore gives the same feel and control of the main clutch which is possible with a direct connected hand lever but at the same time it reduces the labor of the main clutch and provides an arrangement less subject to wear.

I claim:

1. In combination, a rotating drive wheel, a power lever mounted for rotation concentric therewith, a driving connection extending from the power lever, a clutch block carried by the power lever, a clutch lever pivoted on the power lever adapted to move the clutch block into and out of contact with the wheel, means interposed between the clutch lever and the power lever to limit their angular movement.

2. In combination, a rotating drive wheel, a power lever mounted for rotation concentric therewith, a driving connection extending from the power lever, a clutch block carried by the power lever, a clutch lever pivoted on the power lever adapted to move the clutch block into and out of contact with the wheel, means interposed between the clutch lever and the power lever to limit their angular movement, a hand lever pivoted at a point removed from the axis of rotation of the wheel and a driving connection between it and the clutch lever.

3. In combination, a rotating drive wheel, a power lever mounted for rotation in a plane perpendicular to the axis of rotation of the wheel, a driving connection leading from the power lever, a clutch block carried by the power lever, a clutch lever pivoted on the power lever and adapted to move the clutch block into and out of contact with the wheel, means interposed between the clutch lever and the power lever to limit their angular movement.

4. In combination a rotating drive wheel, a power lever mounted for rotation concentric therewith, a driving connection extending from the power lever, a clutch block carried by the power lever, a clutch lever pivoted on the power lever adapted to move the clutch block radially into and out of contact with the wheel, means interposed between the clutch lever and the power lever to limit their angular movement.

5. In combination a rotating driving clutch member, a power lever mounted for rotation concentric therewith, a driving connection extending from the power lever, a driven clutch member associated with the power lever, a clutch lever pivoted on the power lever and adapted to move the driven clutch member into and out of contact with the driving clutch member, means interposed between the clutch lever and the power lever to limit their angular movement.

6. In combination a rotating driving clutch member, a power lever mounted for rotation in a plane perpendicular to the axis of rotation thereof, a driving connection leading from the power lever, a control lever pivoted on and extending generally in line with the power lever, a clutch member adapted to be moved into and out of engagement with the driving member, means for limiting the angular movement of the two levers about an axis parallel with the axis of rotation of the drive member.

7. In combination a rotating driving clutch member, a power lever mounted for rotation in a plane perpendicular to the axis of rotation thereof, a driving connection leading from the power lever, a control lever pivoted on and extending generally in line with the power lever, a clutch member adapted to be moved into and out of engagement with the driving member, means for limiting the angular movement of the two levers about an axis parallel with the axis of rotation of the drive member, a hand lever pivoted at a point removed from the drive member and a link connection between it and the clutch lever.

8. The combination with a power lever of means for displacing it comprising a rotating drive member, a clutch member pivoted on the power lever, a control lever pivoted on the power lever generally in line therewith adapted to operate the clutch member, means for limiting the angular movement of the control lever with respect to the power lever, the power lever being adapted to rotate when driven by the driving member through the clutch, a hand lever, a connection between it and the control lever whereby the clutch may be operated independent of position of the power lever.

9. In combination, a rotating friction drive member, a power lever pivoted intermediate its ends concentric with the axis of rotation of the drive member, a power take-off associated with one end and a clutch member associated with the other end of the power lever, a clutch lever pivoted on the power lever adjacent the clutch member, means for rotating the clutch lever with respect to the power lever to move the clutch member into and out of engagement with the friction member.

10. In combination, a rotating friction drive member, a power lever pivoted intermediate its ends concentric with the axis of rotation of the drive member, a power take-off associated with one end and a clutch member associated with the other end of the power lever, a clutch lever pivoted on the power lever adjacent the clutch member, means for rotating the clutch lever with respect to the power lever to move the clutch member into and out of engagement with the friction drive member, and means for limiting the relative angular movement of the two levers.

11. In combination, a rotating friction drive member, a power lever pivoted intermediate its ends concentric with the axis of rotation of the drive member, a power take-off associated with one end and a clutch member associated with the other end of the power lever, a clutch lever pivoted on the power lever adjacent the clutch member, means for rotating the clutch lever with respect to the power lever to move the clutch member into and out of engagement with the friction member, the clutch lever moving means comprising a control lever and a rigid pivoted connection between it and the clutch lever, the pivot point of the clutch lever being adapted to move toward the control lever when the clutch is engaged with the friction member whereby movement of the power lever tends to release the clutch.

12. In combination, a rotating friction drive member, a power lever pivoted concentric with the axis of rotation of the drive member, a power take-off and a clutch member associated with the power lever, a clutch lever pivoted on the power lever adjacent the clutch member, means for rotating the clutch lever with respect to the power lever to move the clutch member into and out of engagement with the friction member, the clutch lever moving means comprising a control lever and a rigid pivoted connection between it and the clutch lever, the pivot point of the clutch lever being adapted to move toward the control lever when the clutch is engaged with the friction member whereby movement of the power lever tends to release the clutch.

13. In combination, a rotating friction drive member, a power lever pivoted concentric with the axis of rotation of the drive member, a power take-off and a clutch member associated with the power lever, a clutch lever pivoted on the power lever adjacent the clutch member, means for rotating the clutch lever with respect to the power lever to move the clutch member into and out of engagement with the friction member, engagement of the clutch member being adapted to cause movement of the power lever toward the clutch lever, rotating means whereby such movement of the power lever responsive to rotation of the clutch lever tends to release the clutch.

14. In combination, a rotating friction drive member, a power lever pivoted concentric with the axis of rotation of the drive member, a power take-off and a clutch member associated with the power lever, a clutch lever pivoted on the power lever adjacent the clutch member, means for rotating the clutch lever with respect to the power lever to move the clutch member into and out of engagement with the friction member, engagement of the clutch member being adapted to cause movement of the power lever toward the clutch lever, rotating means whereby such movement of the power lever responsive to rotation of the clutch lever tends to release the clutch, and means for positively forcing the clutch out of engagement responsive to such movement.

15. In combination, a friction drive member, a movable power member, a power take-off and a clutch associated with the power member, means for engaging the clutch with the friction drive member, the movement of the power member resulting from such clutch engagement tending to release the clutch, and positive means responsive to such movement for forcing the clutch out of engagement.

16. In combination, a friction drive member, a movable power member having a power take-off and clutch associated therewith, rigid clutch operating means for causing engagement of the clutch with the friction drive member, the movement of the power member resulting from such clutch engagement being adapted to work in the same direction as the clutch operating means, tending to release the clutch, and positive means responsive to such movement for forcing the clutch out of engagement.

Signed at Chicago, county of Cook, and State of Illinois, this 4th day of January, 1929.

ASGER EILERSGAARD.